March 3, 1964 L. A. KAMENTSKY 3,123,804

CHARACTER RECOGNITION SYSTEM

Filed Aug. 23, 1960 11 Sheets-Sheet 1

INVENTOR
L.A. KAMENTSKY
BY John K. Mullarney
ATTORNEY

March 3, 1964 L. A. KAMENTSKY 3,123,804
CHARACTER RECOGNITION SYSTEM
Filed Aug. 23, 1960 11 Sheets-Sheet 2

INVENTOR
L. A. KAMENTSKY
BY John K. Mullarney
ATTORNEY

March 3, 1964 L. A. KAMENTSKY 3,123,804

CHARACTER RECOGNITION SYSTEM

Filed Aug. 23, 1960 11 Sheets-Sheet 3

INVENTOR
L. A. KAMENTSKY
BY John K. Mullarney
ATTORNEY

March 3, 1964 L. A. KAMENTSKY 3,123,804

CHARACTER RECOGNITION SYSTEM

Filed Aug. 23, 1960 11 Sheets-Sheet 4

INVENTOR
L. A. KAMENTSKY
BY John K. Mullarney
ATTORNEY

INVENTOR
L. A. KAMENTSKY
BY John K. Mullarney
ATTORNEY

INVENTOR
L. A. KAMENTSKY
BY John K. Mullarney
ATTORNEY

INVENTOR
L. A. KAMENTSKY
BY John K. Mullarney
ATTORNEY

INVENTOR
L. A. KAMENTSKY
BY John K. Mullarney
ATTORNEY

March 3, 1964 L. A. KAMENTSKY 3,123,804

CHARACTER RECOGNITION SYSTEM

Filed Aug. 23, 1960 11 Sheets-Sheet 9

INVENTOR
L. A. KAMENTSKY
BY John K. Mullarney
ATTORNEY

INVENTOR
L. A. KAMENTSKY
BY John K. Mullarney
ATTORNEY

March 3, 1964 L. A. KAMENTSKY 3,123,804

CHARACTER RECOGNITION SYSTEM

Filed Aug. 23, 1960 11 Sheets-Sheet 11

INVENTOR
L. A. KAMENTSKY
BY John K. Mullarney
ATTORNEY 3,123,804
Patented Mar. 3, 1964

3,123,804

CHARACTER RECOGNITION SYSTEM

Louis A. Kamentsky, Plainfield, N.J., assignor to Bell Telephone Laboratories, Incorporated, New York, N.Y., a corporation of New York Filed Aug. 23, 1960, Ser. No. 51,444
13 Claims. (Cl. 340—146.3)

This invention relates to pattern recognition systems and more specifically to means for automatically reading printed and handwritten characters.

Many systems have been proposed heretofore for automatically reading printed alphabetical letters and Arabic numerals (hereinafter referred to as alpha-numeric characters). The latter-day machine reading systems are resorting more and more to an optical or flying spot scanner wherein an electron beam is deflected, either electrostatically or electromagnetically, with respect to the field of the character to be read. A photo-sensitive element detects the light reflected from the character field and identifies the intersections made by the deflected electron beam with marks or lines in the character field. These intersections provide an indication of the identity of the character.

In the past the electron beams of the aforementioned optical scan systems have generally been deflected in accordance with a matrix or raster type scanning pattern. It has been found, however, that by deflecting the beam in accordance with certain non-raster scanning patterns composed of straight line segments, the logic circuitry necessary to uniquely define a scanned character can be very greatly reduced in complexity and number of components. Furthermore, since the non-raster, as opposed to the matrix or raster, scanning patterns are in most instances composed of a fewer number of scan or line segments, the time necessary for an electron beam to be deflected through a given character field is greatly reduced, thus rendering such a device capable of recognizing characters at a greater rate than prior art systems. However, for a non-raster type scan to be at all practicable it is essential that the scan pattern be substantially centered over the character to be read and any deviation therefrom results in reduced accuracy of the system.

It is accordingly a primary object of the present invention to achieve accurate registration of a character recognition scan pattern with a character to be read.

It is a further object of the invention to accurately and expeditiously center a scan pattern over the field of a character to be read.

It is another object of the invention to accurately and expeditiously center a non-raster scan pattern over the field of a character to be read.

Further objects of the present invention are to reduce the cost and complexity of systems for automatically reading printed or handwritten alpha-numeric characters.

These and other objects are attained in accordance with the present invention wherein a flying spot scanner is controlled by logic circuitry to define a pair of scan patterns. The first of said scan patterns is used for achieving registration of the second scan pattern with the character to be read. The second scan pattern, which may be of the non-raster type, is utilized for character recognition purposes. In accordance with the invention, the characters to be read are printed or hand written in a predetermined fashion directly below a registration bar that is printed on the form or paper. As the form or paper is moved under the scanner the first scan pattern is successively generated and moved sequentially in each of a plurality of positions until it registers with the printed registration bar. That is, a scanning of the first scan pattern is carried out until registration between the same and the registration bar occurs. With the occurrence of registration, the flying spot scanner is controlled to generate the second scan pattern. As mentioned, the characters are written a given distance below the registration bar and hence, if this second pattern is offset a corresponding distance with respect to the first pattern, the second scan pattern, when generated, will be accurately centered over the character to be read.

It is a feature of the present invention that the character recognition scan pattern by centered vertically and/or horizontally with respect to the character to be read.

It is an additional feature of the invention that the characters to be read be printed or hand written beneath a registration bar which comprises aligned alternate dashes and dots, each character being disposed a distance below a dot.

Other objects and features and many of the attendant advantages of the invention will be readily appreciated as the same becomes better understood by reference to the following detailed description when considered in connection with the accompanying drawings in which.

Figure 16:
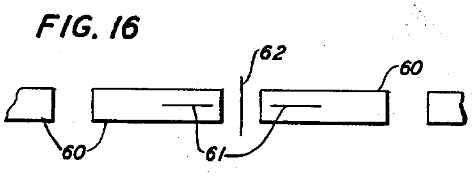
Figure 15:
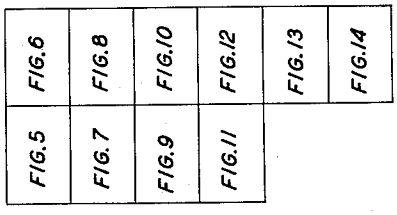
Figure 12:
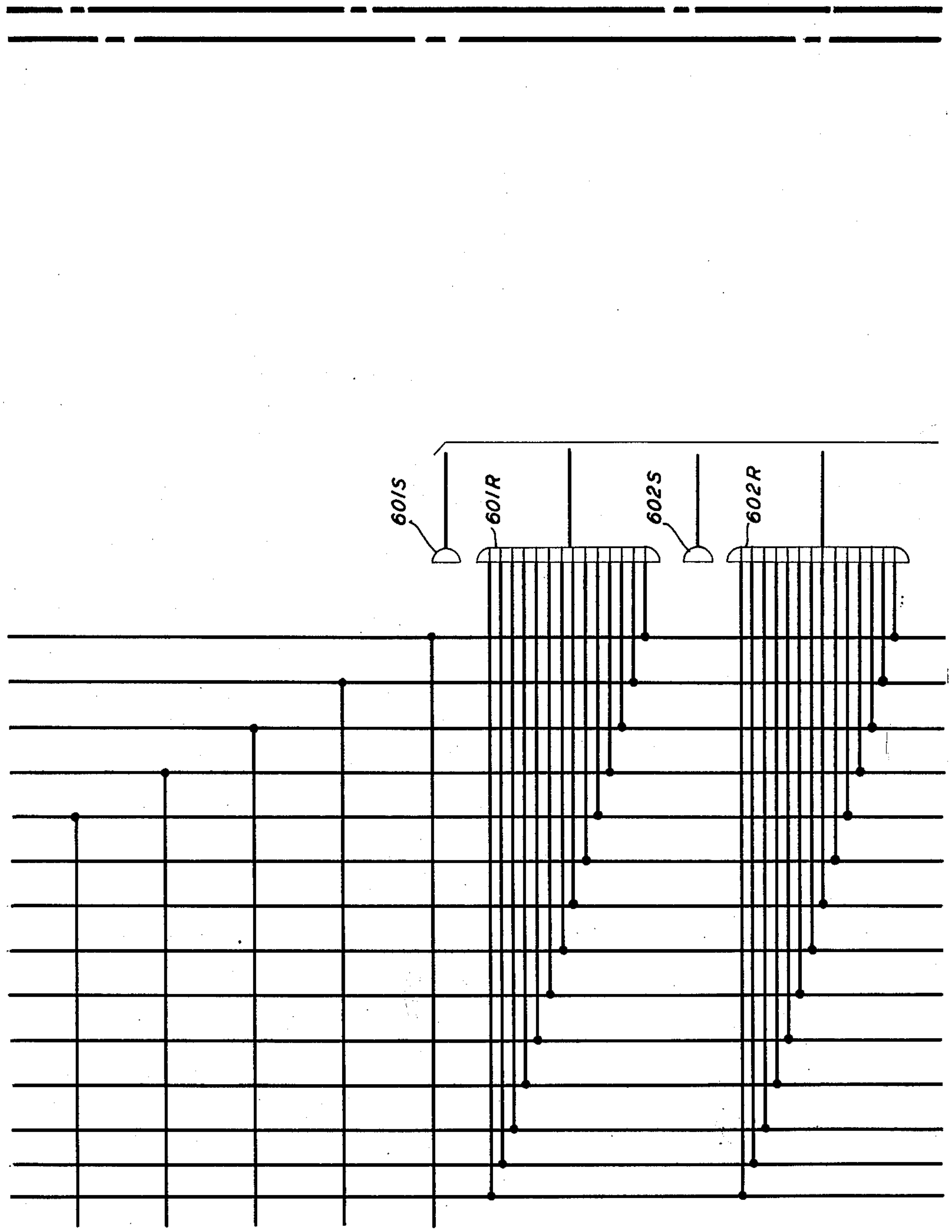
Figure 13:
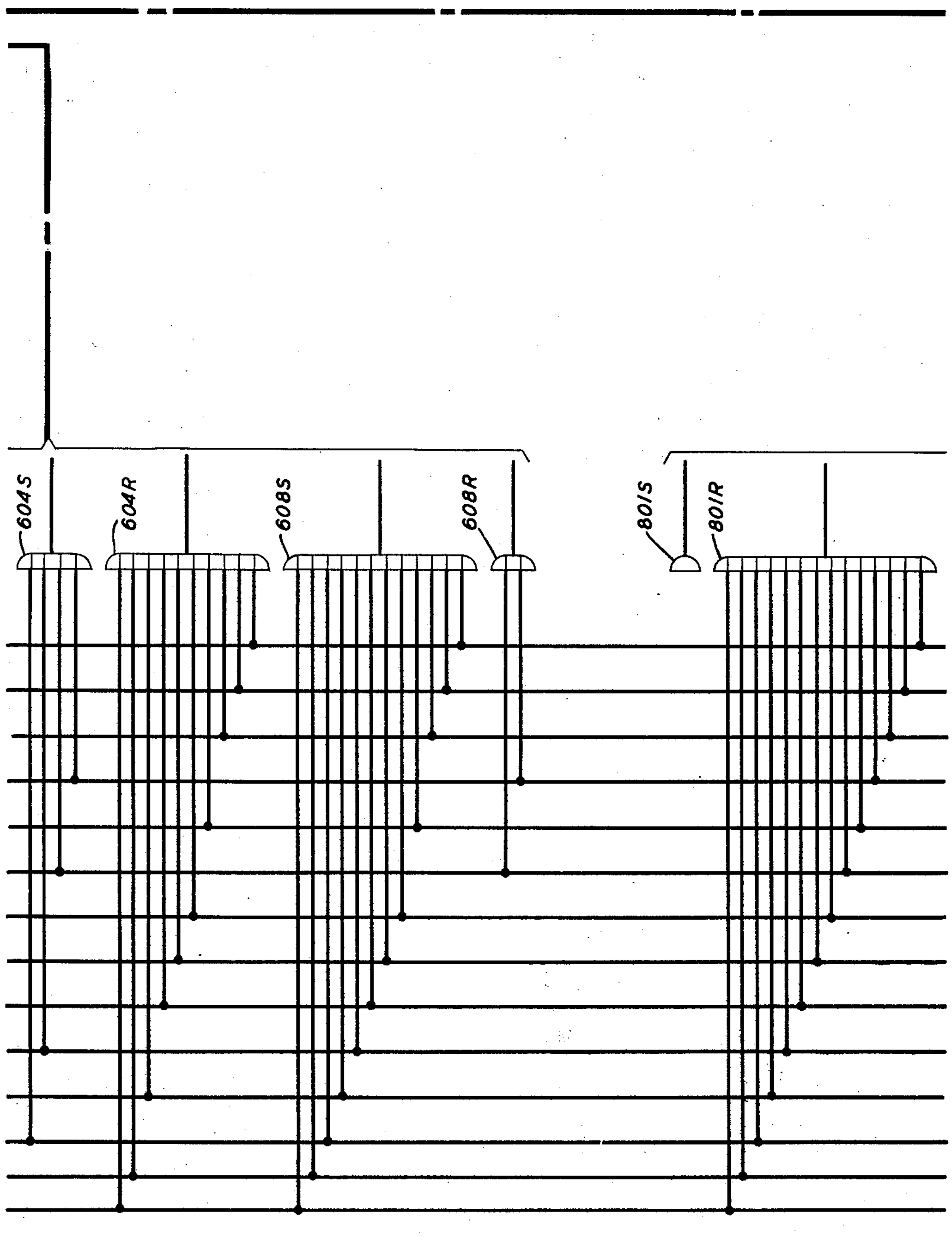
Figure 14:
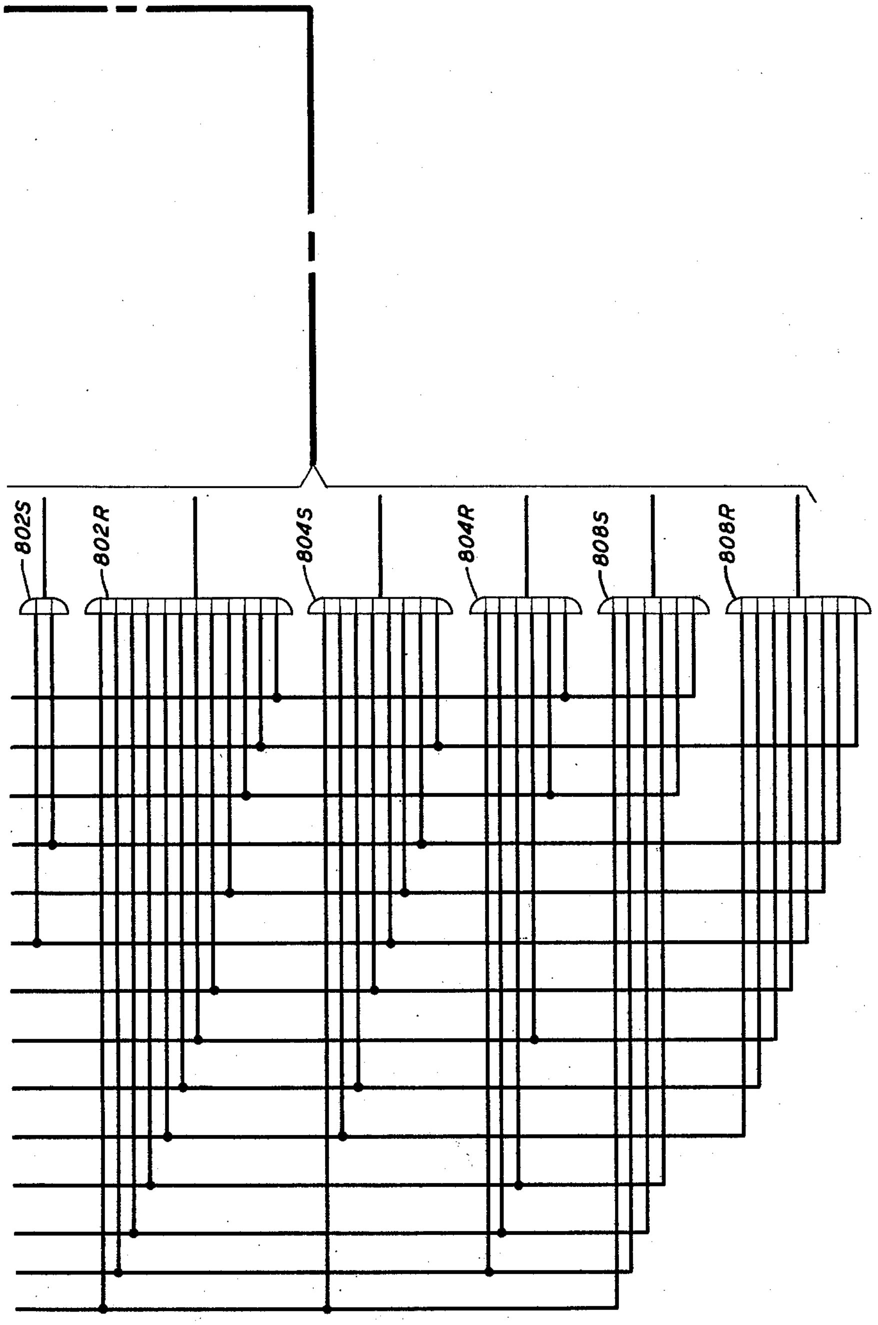

FIGS. 5 through 14, when arranged as shown in FIG. 15, show a detailed block diagram schematic of one illustrative embodiment of the character recognition system of the invention; and FIG. 16 is a diagram of another registration bar arrangement in accordance with the principles of the present invention.

Figure 1:
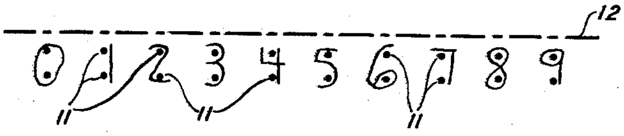
FIG. 1 illustrates a typical row of handwritten characters and a juxtaposed registration bar in accordance with the principles of the present invention.

Turning now to the drawings, FIG. 1 shows a typical row of handwritten Arabic numerals and a registration bar disposed thereabove in accordance with the principles of the present invention. The numerals are formed about the guide dots 11 (two guide dots are utilized for the reading of Arabic numerals and four guide dots for alphabetical letters) in the manner shown in the figure. The writer is instructed to write ordinary characters using the dots as a guide in the illustrated fashion, to avoid crossing the guide dots, and to write open top fours. This method of writing comprises no part of applicant's invention and it is shown herein merely for purposes of facilitating the explanation of the invention. As the description proceeds it will be obvious to those in art that the principles of the present invention are equally applicable to other and different schemes for character recognition. The illustrated guide dot method of writing is fully disclosed in the copending application of T. L. Dimond, Serial No. 678,213, filed August 14, 1957.

In accordance with the invention, a line or bar 12 is printed above the row of characters for the purpose of achieving registration between a character recognition scan pattern and each character to be read. This registration bar comprises aligned alternate dashes and dots. As illustrated in FIG. 1, each of the dots of the registration bar is aligned vertically with the guide dots around which each character is written. In other schemes not utilizing guide dots, the character to be read is simply written a given distance below a dot of the registration bar.

Figure 2:
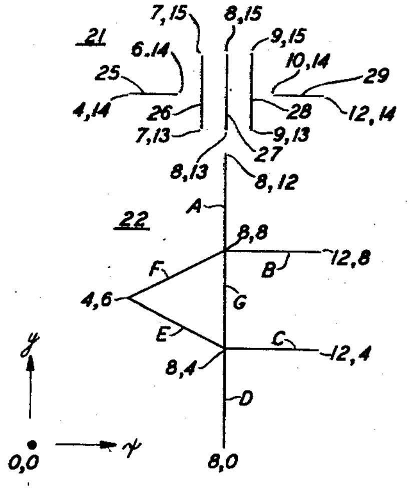
FIG. 2 is an enlarged pictorial representation of the pair of scan patterns generated by the flying spot scanner in accordance with the present invention.

In accordance with the present invention, a flying spot scanner is controlled by logic circuitry to define a pair of scan patterns having a configuration such as illustrated in FIG. 2 of the drawings. The first scan pattern 21 is used for achieving registration of the second scan pattern 22 with the character to be read, as will be described hereinafter. The second scan pattern 22, comprising scan line segments A through G, is utilized for character recognition purposes and it is similar to the character recognition scheme disclosed in the above-cited copending application of T. L. Dimond. The identity of a particular character is determined by noting the intersections, if any, made by scan line segments A through G with lines or marks in the character field. If the characters are formed about the guide dots in the described manner, the intersections of the scan line segments A through G with the character lines are unique for each character. It is to be understood, however, that the invention is in no way limited to the character recognition scan pattern illustrated at 22 in FIG. 2, and other and different scan patterns, either of a limited raster or non-raster type, can advantageously be utilized in accordance with the principles of the present invention.

As will be described in greater detail hereinafter, the first scan pattern 21 is successively generated and moved sequentially in each of a plurality of positions until it registers with the printed registration bar. When registration occurs, the flying spot scanner is switched, i.e., controlled, to generate the second scan pattern 22. The characters written about the guide dots 11 are a given distance below the registration bar and hence, if the second pattern 22 is offset a corresponding distance with respect to the first pattern 21, the second pattern will be quite accurately positioned over a character, for reading purposes. That is, when pattern 22 is generated, the point of intersection of scan line segments A, B, F, and G will be centered over an upper guide dot 11 and the point of intersection of segments C, D, E, and G will be centered over the lower dot.

As an aid in explaining the manner in which the scan patterns 21 and 22 are generated, an $x$, $y$ coordinate system has been utilized to designate the relative positions of the scan line segments of FIG. 2. The point of origin (O, O) has been chosen arbitrarily. The scan line segment 25 of scan pattern 21 extends from the point 4, 14 to the point 6, 14. That is, it extends horizontally two units in the $x$ direction. And the scan line segment A of pattern 22 extends from the point 8, 12 to the point 8, 8, or four units in the $y$ direction.

The first scan pattern 21 comprises five scan line segments 25 through 29. As mentioned heretofore, these five scan segments are successively and continuously generated until registration between the same and the registration bar occurs. This condition of registration is typified in FIG. 4. The dash, dot segments of the registration bar 12 are shown in block form and are exaggerated in size. The first scan pattern is shown superimposed on the registration bar. As indicated in this figure, registration occurs when the scan line segments 25 and 29 fall on the two dashes of bar 12, the segment 27 intersects the dot of bar 12, and the scan segments 26 and 28 fail to intersect a line or mark.

Figure 3:
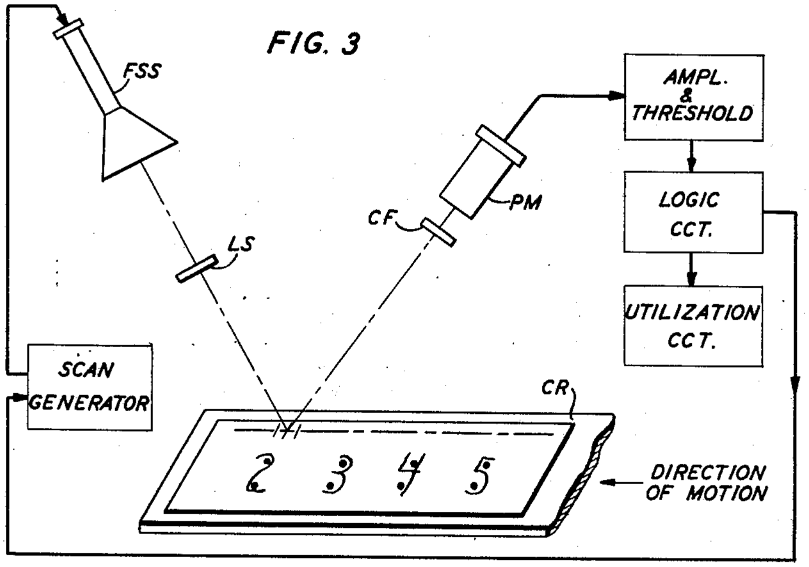
FIG. 3 is an over-all block and pictorial diagram of the instant character recognition system.

The scan patterns illustrated in FIG. 2 are generated by the flying spot scanner system shown in FIG. 3. The light spot from a flying spot scanner designated FSS is focused by means of lens system LS on the paper or form on which appear the registration bar and the characters to be automatically recognized. This paper or form as shown in FIG. 3 is placed on a carriage CR which is moved slowly from right to left by a mechanism (not shown) into the field of flying spot scanner FSS. The scanner is initially controlled by the scan generator to successively generate the first scan pattern until registration occurs, as heretofore described. The light pattern from the flying spot scanner focused on the paper or form is directed through a color filter CF to a photomultiplier PM, the output of which is fed to the logic circuit of the present invention via an amplifier and threshold circuit. Upon the occurrence of registration between the first scan pattern and the registration bar, a signal is delivered from the logic circuit to the scan generator to effect generation of the second scan pattern. This second pattern need only be generated once for recognition purposes. The first scan pattern is thence regenerated and the cycle is repeated.

The successively generated first scan pattern is moved sequentially in each of a plurality of vertical positions of a column as the form or paper is plassed slowly under the scanner. These positions extend from a first position above the registration bar to a last position somewhat below said bar. If during the downward sweep of the first scan pattern registration should occur, the second scan pattern is immediately generated. If registration does not occur, the first scan pattern reaches the end of its downward movement and the cycle of operation is again repeated. In general, a number of such vertical columns (i.e. downward sweeps) will be generated before registration occurs.

In the illustrative embodiment of the invention, the dots around which the characters are formed are preferably printed with an ink that is made invisible to the scanner by filter CF.

A detailed description of the flying spot scanner deflection control circuitry, the scan registration logic circuitry, and the recognition logic will now be given with respect to FIGS. 5 through 14 of the drawings when arranged as shown in FIG. 15.

Figure 5:
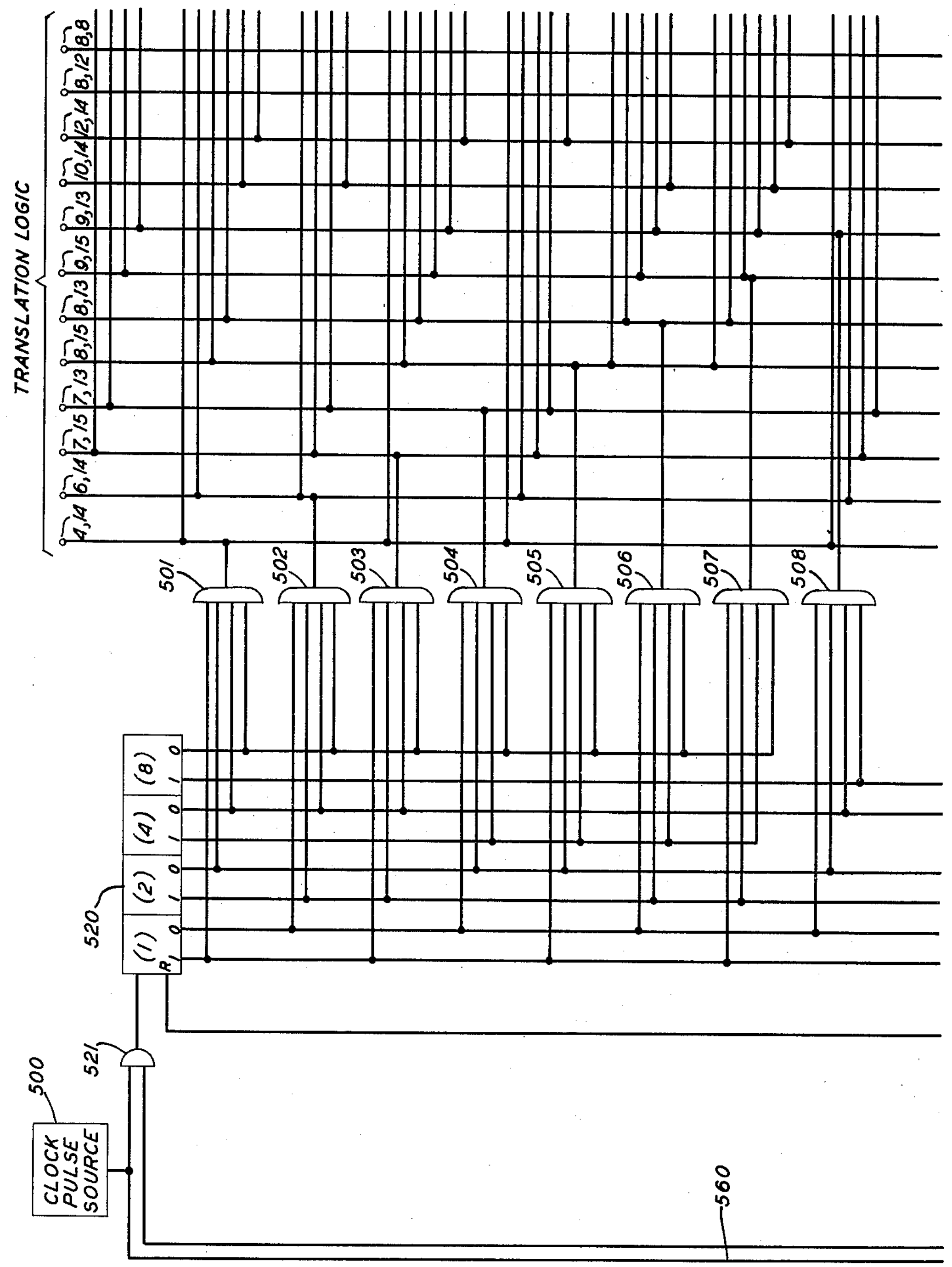

The deflection control circuitry of the flying spot scanner, the registration logic circuitry, and the recognition logic are synchronized by a clock pulse source 500, shown in FIG. 5. Clock pulse source 500 supplies a continuous train of clock pulses at a desired frequency and may, advantaegously, be any type of clock pulse source known in the art. The clock pulses from the output of clock pulse source 500 are supplied to binary counter 520 via the AND gate 521. For the present it shall be assumed that an energizing signal is delivered to the other input of AND gate 521 and hence the clock pulses from source 500 are fed directly to the binary counter.

Figure 7:
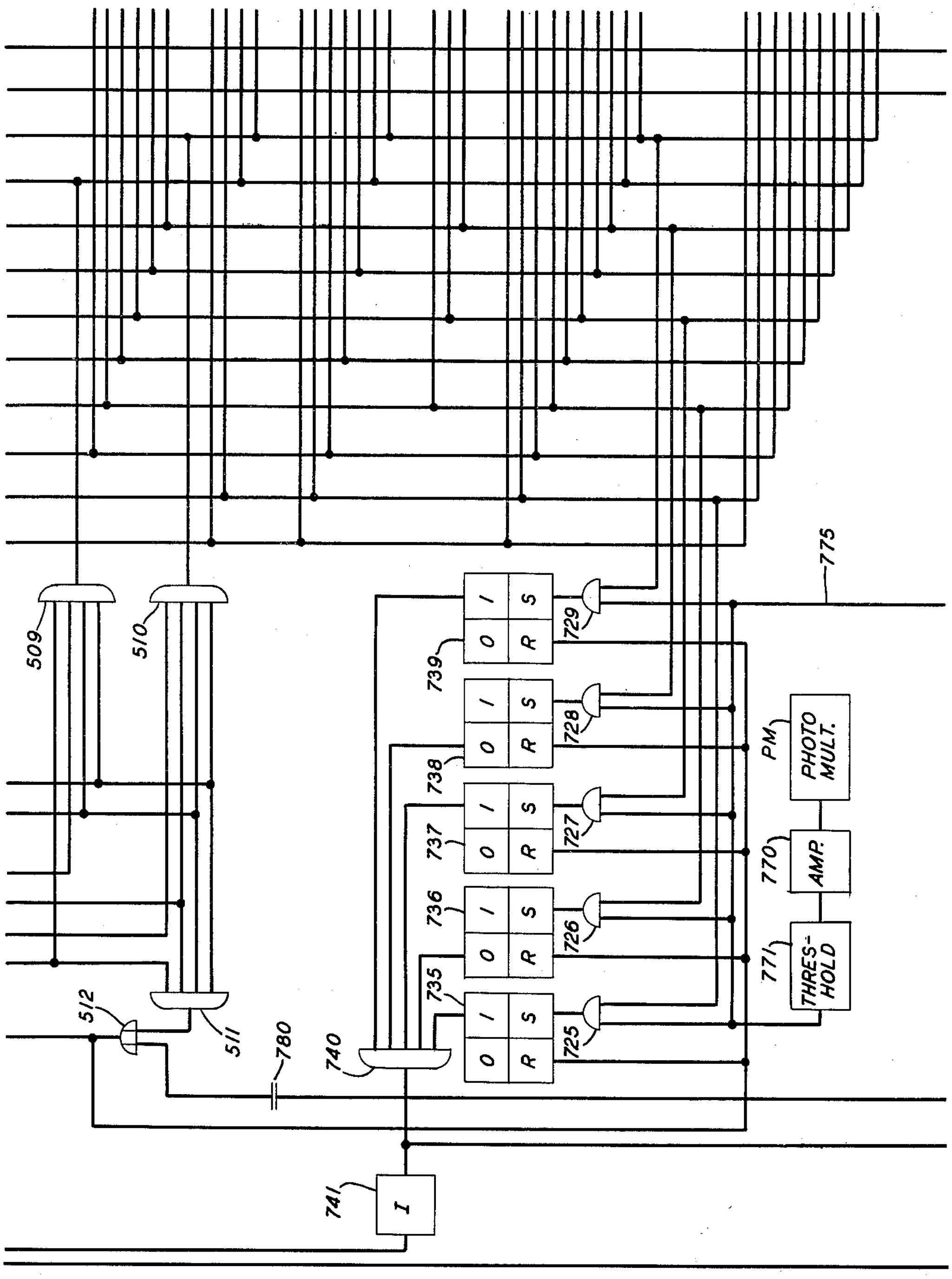
Figure 8:
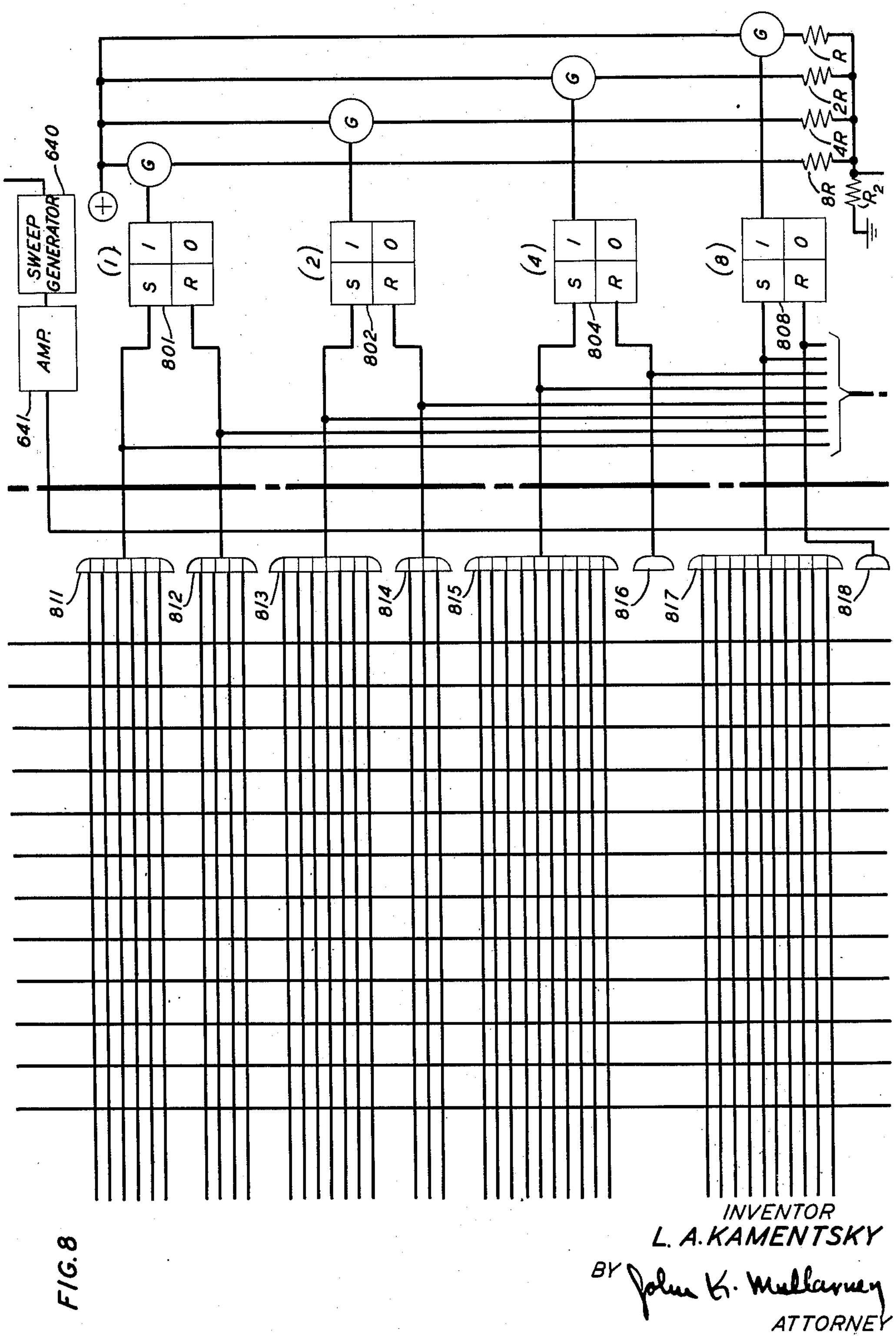

Binary counter 520 may advantageously be any type of binary counter known in the art and, as shown, comprises four binary stages. Each of these four stages is designated with a designation in parentheses indicating the decimal equivalent of the binary stage. Each of the four stages of binary counter 520 is arranged in the manner known in the art to supply "two rail logic output signals." In other words, each stage of binary counter 520 has (0) and (1) output leads. These leads extend to form a translation circuit, as shown in FIGS. 5 and 7. Because binary counter 520 comprises four binary stages, the counter is capable of counting from 0 to 15, and accordingly as clock pulses from clock pulse source 500 are applied to the input of binary counter 520, the counter will count, in standard binary fashion, the successive pulses applied thereto. For example, when the first clock pulse is applied to stage (1) of the binary counter 520, this stage will set to its "1" state and will supply a signal over its (1) output lead. When the second clock pulse from clock pulse source 500 is applied to binary counter 520, stage (1) will be set to its "0" state and stage (2) will be set to its "1" state in typical binary fashion. As succeeding pulses from clock pulse source 500 are applied to binary counter 520, the respective stages will operate in the manner well known in the art.

The two rail logic (0) and (1) output leads from the respective stages of binary counter 520 are connected in a translation circuit, in the manner shown in FIGS. 5 and 7, to AND gates 501 through 510. The output of each of these AND gates supplies a signal which is utilized by the flying spot scanner deflection circuitry, in the manner to be described hereinafter. The inputs of the AND gate 501, for example, are connected respectively to the (0) output lead of stage (8), the (0) output lead of stage (4), the (0) output lead of stage (2), and the (1) output lead of stage (1) of binary counter 520. Thus, when the respective stages in binary counter 520 are set such that stage (1) is in its "1" state and stages (2), (4), and (8) are in the "0" state, AND gate 501 will be actuated to supply an energizing output signal. The energizing signal will remain on the output lead of AND gate 501 until the next succeeding clock pulse from source 500 resets the binary counter 520. The remaining AND gates 502 through 510 are connected to the respective (0) and (1) output leads of the various stages of counter 520 in a similar fashion so as to provide output signals which correspond to the count in the binary counter. For example, an energizing signal appears at the output of AND gate 502 when the second clock pulse is applied to counter 520. This latter signal is terminated by the application of the third clock pulse to counter 520, and concurrently therewith an energizing signal appears at the output of AND gate 503; and so on.

The AND gate 511, shown in FIG. 7, is connected to the (1) output leads of stages (1), (2), and (8) and to the (0) output lead of stage (4) of binary counter 520. When the eleventh clock pulse is applied to the counter, an energizing signal appears on the output lead of AND gate 511. This latter energizing signal is fed, via OR gate 512, to the reset terminal of counter 520 to reset the same to its initial "0" state. The very next clock pulse from source 500 then sets the binary stage (1) once again to its "1" state and the above-described cycle of operation is thereafter repeated.

The output leads of AND gates 501 through 510 are respectively connected to the first ten rail leads of the translation logic circuit, shown in part in FIGS. 5 through 8. The output lead of AND gate 501 is connected to the first rail lead, designated 4, 14; the output of AND gate 502 is connected to the second rail lead, designated 6, 14; and the output of AND gate 506, for example, is connected to the sixth rail lead, designated 8, 13. It will be noted that the designations of the first ten rail leads correspond to the ten *x*, *y* coordinate points that define the scan pattern 21, shown in FIG. 2.

Figure 6:
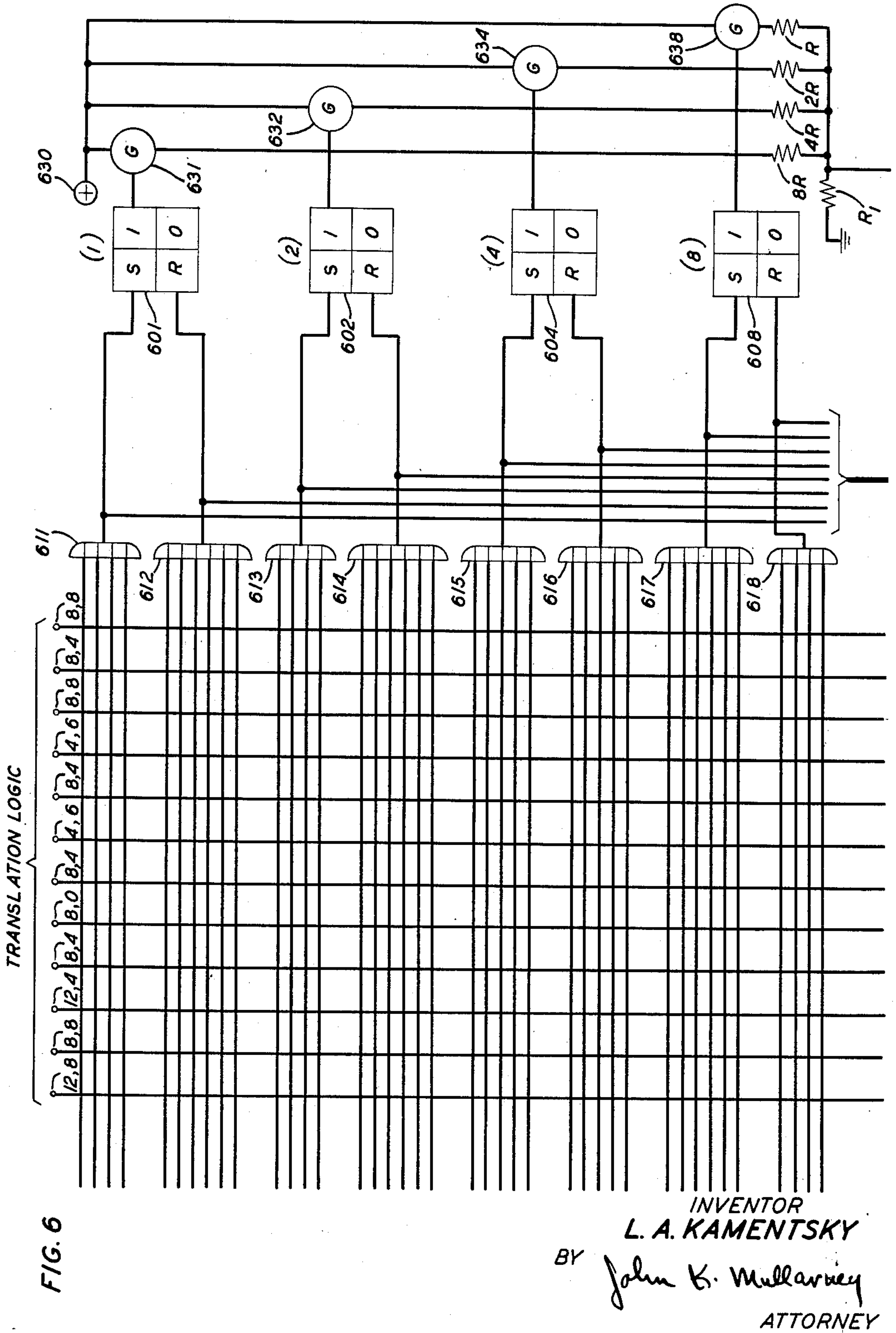

The first ten rail leads of the translation logic circuit are connected, in a manner to be described hereinafter, to the set and reset terminals of flip-flops 601, 602, 604, and 608, shown in FIG. 6, via the OR gates 611 through 618. The first ten rail leads are likewise connected to the set and reset terminals of flip-flops 801, 802, 804, and 808, shown in FIG. 8, via the OR gates 811 through 818. The flip-flops provide signals which are utilized to deflect the electron beam of the flying spot scanner through the scan patterns illustrated in FIG. 2 of the drawings.

The flip-flops 601, 602, 604, and 608 are associated with the *x* coordinate deflection of the electron beam. That is, they provide signals useful in achieving the desired deflection of the electron beam in the *x* direction. And the flip-flops 801, 802, 804, and 808 are associated with the *y* coordinate deflection of said electron beam.

Each of the flip-flops 601, 602, 604, and 608 is designated with a designation in parentheses thereabove indicating the decimal equivalent of the flip-flop. Accordingly, in a manner to be described hereinafter, the flip-flop 601 provides a weighted output signal which results in an electron beam deflection of one unit in the *x* direction. The flip-flop 602 provides a weighted output signal that results in a beam deflection of two units in the *x* direction, and the flip-flop 608 when set causes an eight unit deflection of the electron beam. Various combinations of set and reset conditions of flip-flops 601, 602, 604, and 608 serve to provide beam deflections from 0 to 15 units in the *x* direction.

Each of the flip-flops 801, 802, 804, and 808 is likewise designated with a designation in parentheses thereabove which is indicative of the decimal equivalent of the flip-flop. Thus, in similar fashion, the various combinations of set and reset conditions of these flip-flops serve to deflect the electron beam of the flying spot scanner from 0 to 15 units in the *y* direction.

A conventional gated resistance, voltage divider arrangement is used to achieve the proper weighting of the flip-flop signals. The (1) outputs leads of flip-flops 601, 602, 604, and 608 are connected respectively to the gates 631, 632, 634, and 638. Each of these gates closes a path from a potential source 630, through an associated resistor, and through a common resistor $R_1$ to ground. For example, the (1) output lead of flip-flop 601 is connected to gate 631, and when this flip-flop is in its "1" state gate 631 will be actuated to close a path from potential source 630 through resistor 8R and common resistor $R_1$ to ground. Similarly, when flip-flop 608 is set to its "1" state, gate 638 will be actuated to complete a path from potential source 630 through resistor R and common resistor $R_1$ to ground. It will be observed that the operation of the respective gates 631, 632, 634, and 638 changes the combination of resistors 8R, 4R, 2R, and R which are connected in parallel between potential source 630 and common resistor $R_1$.

If the value of resistance of resistor R is much larger than that of $R_1$ ($R >> R_1$), the current flow through $R_1$ and hence the voltage drop thereacross is determined by which of the parallel resistors are operatively connected in the circuit. As indicated by the prefix, the resistor 8R has a resistance eight times that of resistor R. The relationship between the resistance and the current flow in a circuit path is an inverse one, and hence the current flow in the path including resistor R will be eight times that in the path including resistor 8R. Thus, when the resistor 8R is operatively connected in the circuit, a current of one unit (e.g., 100 milliamperes) will flow through resistor $R_1$. The resistor 4R, being one-half the resistance of 8R, permits a current flow of two units (e.g., 200 milliamperes) in resistor $R_1$. The resistor 2R when connected in the circuit results in a current flow of four units through resistor $R_1$, and the resistor R when connected permits a current flow of eight units. The voltage drop across $R_1$ is, of course, directly proportional to the current flow therethrough. Hence, it is seen that the voltage drop across resistor $R_1$ is dependent upon which, if any, of the flip-flops 601, 602, 604, and 608 are set to their "1" state. Each flip-flop results in a voltage drop across resistor $R_1$ which is equivalent to the aforementioned decimal equivalent assigned to the flip-flop.

Various combinations of set and reset conditions of flip-flops 601, 602, 604, and 608 serve to provide voltage drops across resistor $R_1$ which vary from 0 to 15 units. For example, if the flip-flops 601 and 608 are set to their "1" state, a voltage drop of 9 voltage units appears across resistor $R_1$.

As the flip-flops 601, 602, 604, and 608 are successively set and reset, in a manner to be described hereinafter, a voltage step function is developed across resistor $R_1$ and applied to the input of a ramp or sweep generator 640. This sweep generator serves to generate an electrical sweep waveform the magnitude of which is proportional to the magnitude of the input voltage step. A sweep generator for suitably performing this function is disclosed in the copending application of W. H. Highleyman, Serial No. 835,586, filed August 24, 1959, now U.S. Patent No. 3,047,747, issued July 31, 1962. The sweep generator disclosed in the Highleyman application generates a waveform composed of discontinuous, equal duration, linear sweeps in response to successive input voltage steps. Adjacent sweeps may have the same or different slopes of the same or different amplitudes, both depending upon the magnitude of the input voltage. Each sweep starts at the point at which the preceding sweep ended. If the electron beam of the flying spot scanner is deflected electromagnetically, the generated sweep waveform will be a current waveform, whereas a voltage waveform should be generated for electrostatic deflection. The circuitry disclosed in the copending application of W. H. Highleyman can generate either current or voltage sweep waveforms.

The output of sweep generator 640 is applied to the *x* deflection coil of the flying spot scanner FSS via an amplifier 641.

The *y* register of flip-flops 801, 802, 804, and 808 is connected to a gated resistance, voltage divider arrangement identical to that described above. A voltage step function is developed across the resistor $R_2$ and delivered to a second sweep generator 642, all as described heretofore. The output of sweep generator 642 is applied to the *y* deflection coil of the flying spot scanner FSS via an amplifier 643.

Considering now the operation of the above-described circuitry, with the arrival of the first clock pulse stage (1) of the binary counter 520 is set to its "1" state and, as a result, an energizing signal appears on the output lead of AND gate 501, as heretofore described. The output of AND gate 501 is connected to the rail lead designated 4, 14 and hence said energizing signal is applied to the latter. The *x* register of flip-flops is connected to rail lead 4, 14 as follows: the reset terminals of flip-flops 601, 602, and 608 are connected to this rail lead via OR gates 612, 614, and 618, while the set terminal of flip-flop 604 is connected to the rail lead via OR gate 615. Accordingly, only flip-flop 604 is set to its "1" state and as a result an equivalent voltage of 4 voltage units is developed across resistor $R_1$. A corresponding sweep current is generated by sweep generator 640, as heretofore described, and this is applied to the *x* deflection coil.

The *y* register of flip-flops is likewise connected to the rail lead designated 4, 14. The set terminals of flip-flops 802, 804 and 808 are connected to this rail lead via OR gates 813, 815, and 817, respectively, and the reset terminal of flip-flop 801 is connected to this rail lead via OR gate 812. Accordingly, the energizing output signal from AND gate 501 when applied to rail lead 4, 14 serves to further set the flip-flops 802, 804, and 808 to their "1" state. A voltage equivalent to the decimal equivalent of these flip-flops (i.e., 14 units) is developed across resistor $R_2$ and a corresponding sweep current signal is generated by sweep generator 642 and applied to the *y* deflection coil.

The end result of the above-described operation is that the electron beam of the flying spot scanner FSS is moved or swept linearly from a pre-existing position to the point 4, 14, shown in FIG. 2. The beam will thereafter remain at point 4, 14 until the arrival of the second clock pulse.

In a fashion similar to that described above, the second clock pulse results in an energizing signal being delivered to the second rail lead 6, 14 from AND gate 502. The set terminals of flip-flops 602 and 604 are coupled to rail lead 6, 14, as are the reset terminals of flip-flops 601 and 608. Accordingly, only flip-flops 602 and 604 are set to their "1" state.

The connections of flip-flops 801, 802, 804, and 808 to the second rail lead 6, 14 are identical to the connections of these flip-flops to the first rail lead 4, 14. Hence, these flip-flops remain in the same states as heretofore described.

With the *x* and *y* flip-flop registers set as described, in response to the second clock pulse, the electron beam of the flying spot scanner is swept from the point 4, 14 to the point 6, 14 to thereby define the scan line segment 25. The beam will thereafter remain at point 6, 14 until the arrival of the third clock pulse.

The third clock pulse results in an energizing signal on rail lead 7, 15. The set terminals of flip-flops 601, 602, and 604 are connected to this rail lead, as is the reset terminal of flip-flop 608. The flip-flops 601, 602, and 604 are therefore set to their "1" state. The set terminals of flip-flops 801, 802, 804 and 808 are conencted to rail lead 7, 15 and therefore each is set to its "1" state. With the *x* and *y* flip-flops set as described, the electron beam will be swept from the point 6, 14 to the point 7, 15. The beam then remains at this latter point until the arrival of the next clock pulse.

As an energizing signal is applied succesively to the first ten rail leads, the *x* and *y* flip-flops are appropriately set to cause the beam of the flying spot scanner to move to each of the ten points associated with scan pattern 21. If no registration occurs between the scan pattern 21 and the registration bar, as heretofore described, the binary counter 520 is reset to its initial "0" state and the cycle of operation is repeated to generate another scan pattern 21.

The clock pulses from clock pulse source 500 are further applied to a conventional frequency divider 1060 via the leads 560 and 960. This divider has a division ratio of five hundred and fifty (550); that is, for every 550 input clock pulses a single output pulse is derived. This output pulse is applied via OR gate 1062 to the vertical sweep generator 1061 which in response thereto generates a sawtooth voltage of long time constant (i.e. substantially equal to the count time of 550 clock pulses). The sawtooth voltage is applied to the vertical or *y* deflection coil for the purposes of shifting the successively generated first scan patterns, such as shown in FIG. 2, through a plurality of successive vertical positions. Since a complete scan pattern 21 is generated for every eleven clock pulses and the aforementioned division ratio is five hundred and fifty, fifty scan patterns are generated for each complete vertical sweep of the scan pattern 21. As will be described hereinafter, this vertical sweep of the first scan pattern is interrupted if the pattern registers with the registration bar 12, as heretofore described. The division ratio given above is only by way of example and it will be clear to those in the art that a division ratio substantially less than five hundred and fifty will generally prove satisfactory. All that is necessary in this regard is that the vertical step like movement of the scan pattern be at a relatively slow rate with respect to the time required for the generation of a single scan pattern 21. Further, the succesively generated scan patterns 21 should be vertically displaced from each other a distance which is something less than the width of the registration bar 12. This is to insure that the scan pattern does not jump or step over the bar 12 in its downward sweep.

As described above, the flying spot scanner is controlled to make five scan line segments for each of the successively generated scan patterns 21, and the light reflections from these scan segments are gated to logic circuitry to determine registration. The manner in which the light reflections from flying spot scanner FSS are picked up and the manner in which these reflections are operated upon will now be described with reference to FIG. 7 of the drawings. As described hereinbefore, the light reflections from the character field are directed to photomultiplier PM. The photomultiplier sees a continuous light reflection throughout each scan line segment. If this scan is intersected by a line or a spurious mark, the light intensity reflected to photomultiplier PM will be reduced as the line or mark is intersected. The output of the photomultiplier shown in FIG. 7 is then a voltage which has a specific direct current level until a mark is encountered. As the scan passes over the mark, the output of photomultiplier PM will then be a pulse with a negative direction. The duration of this pulse corresponds to the width of the line or mark intersected. Accordingly, for each scan there is a specific pattern of voltage on the output of the photomultiplier. If a scan does not intersect a mark, there will be a constant direct current level. However, when a scan intersects a line or mark, there will be a negative pulse from the output of the photomultiplier for this scan. The output of the photomultiplier is applied to amplifier 770, which may advantageously be any type of amplifier known in the art, to amplify and invert the voltage pulse received from the output of photomultiplier PM. The output of amplifier 770 is applied to threshold circuit 771 which determines whether there is indeed a pulse signal. In other words, threshold circuit 771 will distinguish, at some predetermined threshold, weak pulses caused by reflections from dirt specks or smudges from strong pulses indicating the intersection of a true mark. Threshold circuit 771 may also advantageously contain pulse-shaping circuits known in the art which will shape poorly defined pulses obtained from the output of amplifier 770 into sharply defined pulses.

As shown in FIG. 7, the output of threshold circuit 771 is applied respectively to the input of AND gates 725 through 729. The other input terminal of AND gates 725 through 729 is connected respectively to the second, fourth, sixth, eighth, and tenth rail leads designated s, 14; 7, 13; 8, 13; 9, 13; and 12, 14, respectively.

As described heretofore, with the arrival of the second clock pulse from clock pulse source 500, an energizing signal is delivered to the second rail lead 6, 14 and this in turn sets the flip-flops 602 and 604, of the *x* register of flip-flops, and flip-flops 802, 804, and 808, of the *y* register, to their "1" state. With the flip-flops so set, the electron beam of the flying spot scanner is moved linearly from the point 4, 14 to the point 6, 14, as illustrated in FIG. 2. The beam then remains at point 6, 14 until the arrival of the third clock pulse.

The energizing signal from AND gate 502 appears on rail lead 6, 14 throughout the duration of the second clock pulse period, and this energizing signal is connected to one of the input terminals of AND gate 725. The scan line segment 25 is, as indicated, traced or defined during this second clock pulse period. Thus, if the scan line segment 25 encounters a line or mark, the threshold circuit will deliver a pulse signal to AND gate 725 resulting in the energization of the same. In similar fashion, the AND gate 726 will be energized if a line or mark is encountered during the scan segment 26 which occurs during the fourth clock pulse period. Likewise, the AND gates 727, 728, and 729 will be energized if a mark is encountered during scan segments 27, 28, and 29, respectively.

The AND gates 725 through 729 are connected respectively to the set terminals of flip-flops 735 through 739. When concurrent signals appear at the input of an AND gate, the connected flip-flop is set to its "1" state. Accordingly, if one or more of the scan line segments 25 through 29 encounters a line or mark, one or more of the flip-flops 735 through 739 will be set to the "1" state.

Figure 4:
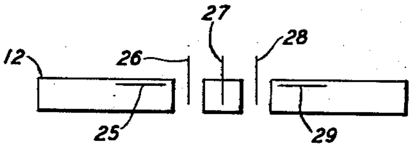
FIG. 4 is a diagram useful in the explanation of the present invention.

As shown in FIG. 4, registration is defined by the intersection of scan line segments 25, 27, and 29 with marks on the paper and no such intersection by scan segments 26 and 28. The setting of flip-flops 735 through 739 is unique for this condition of registration; that is, upon the occurrence of registration flip-flops 735, 737, and 739 are set to their "1" state and flip-flops 736 and 738 remain in their "0" state. The AND gate 740 is connected to the (1) output leads of the set flip-flops 735, 737, and 739 and to the (0) output leads of flip-flops 736 and 738. Thus connected, an energizing signal appears on the output lead of AND gate 740 upon the occurrence of registration.

Figure 9:
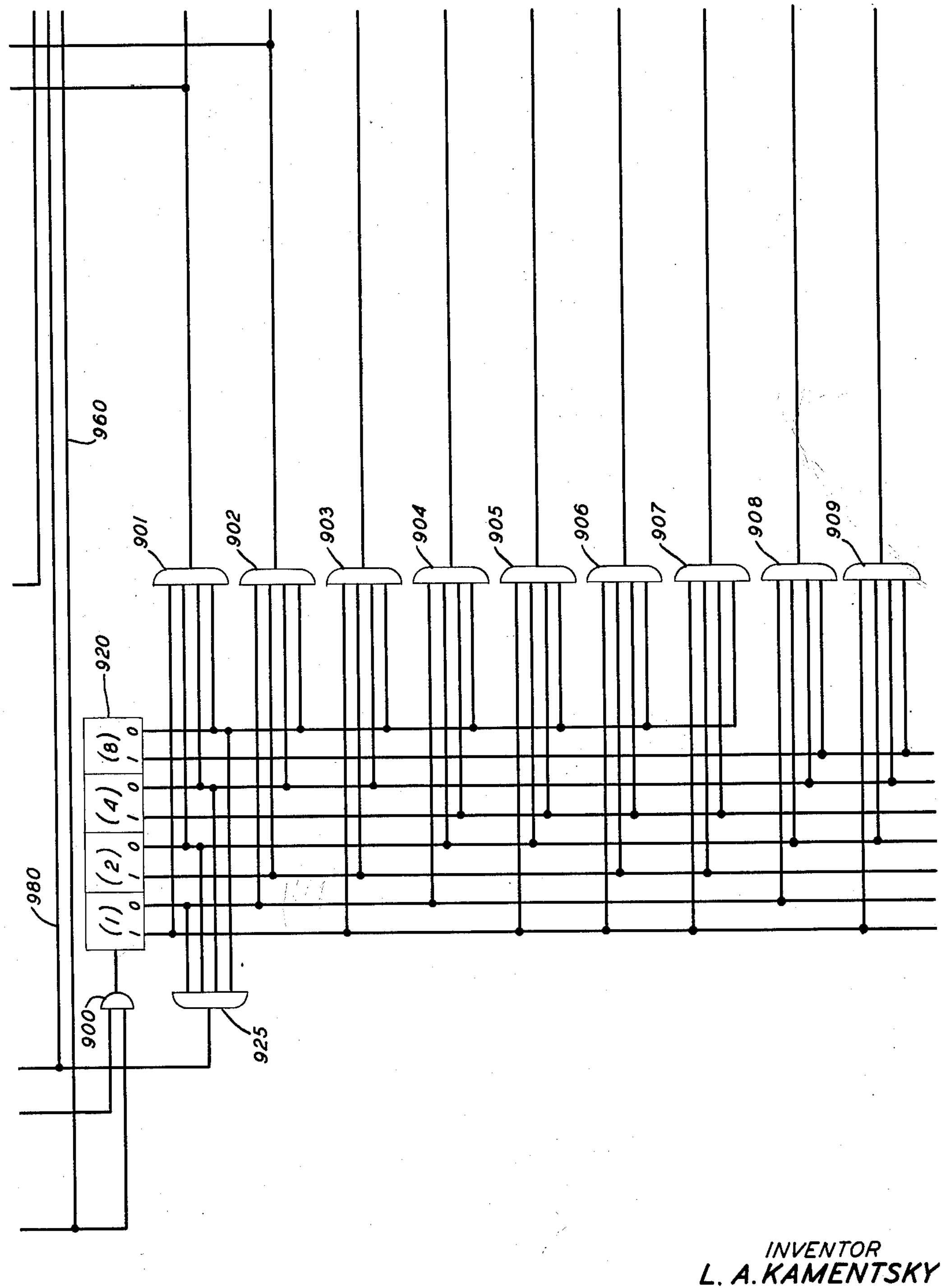

The output lead of AND gate 740 is connected to the input of inverter 741 and to the input of AND gate 900, shown in FIG. 9. The output of inverter 741 is fed to one of the input terminals of AND gate 521. In the absence of an input signal, the inverter delivers an energizing potential to AND gate 521 to thereby permit the passage of clock pulses from clock pulse source 500 to binary counter 520. However, when an output signal from AND gate 740 is fed to the input of inverter 741, the energizing potential supplied by the latter to AND gate 521 is terminated and the delivery of clock pulses to binary counter 520 is interrupted.

The clock pulse source 500 is also connected to the input of AND gate 900 and hence when the energizing output signal of AND gate 740 is delivered to the latter, the clock pulses are fed, via gate 900, to binary counter 920. Thus, when the AND gate 740 produces an output signal in response to the occurrence of registration, the clock pulses are switched from binary counter 520 to binary counter 920.

If the flip-flops 735 through 739 are not set in the unique condition described above, indicative of registration, the clock pulses continue to be fed to binary counter 520. The reset terminals of flip-flops 735 through 739 are connected to the reset lead going to the binary counter 520. Hence, these flip-flops are reset along with counter 520 at the end of each generation of the first scan pattern.

The binary counter 920 is identical to the above-described binary counter 520. Each of the four stages of counter 920 supplies "two rail logic output signals." The AND gates 901 through 914 are connected to the various (0) and (1) output leads of the counter stages in the same manner as described above with regard to gates 501 through 510. Thus, an energizing signal appears at the output of AND gate 901 when the first clock pulse is applied to counter 920. And as succeeding clock pulses are applied to counter 920, energizing signals will appear successively on the respective output leads of AND gates 902 through 914.

The output leads of AND gates 901 through 914 are respectively connected to the last fourteen rail leads of the translation logic circuit. The output lead of AND gate 901 is connected to the first of these fourteen rail leads, designated 8, 12; the output of AND gate 902 is connected to the very next rail lead, designated 8, 8; and the output of AND gate 914, for example, is connected to the last rail lead, designated 8, 8. It will be noted that the designations of the last fourteen rail leads correspond to the fourteen *x*, *y* coordinate points that define the seven scan line segments of recognition scan pattern 22, shown in FIG. 2. Accordingly it will be clear that the binary counter 920, the AND gates 901 through 914, and the last fourteen rail leads of the translation logic circuit, serve to generate the second scan pattern in the same manner as the corresponding counter, gates, and rail leads heretofore described serve to generate the first scan pattern.

The *x* and *y* registers function in the same manner as heretofore described to produce the scan pattern 22. For example, the set terminal of flip-flop 608 is connected to the rail lead 8, 12 via OR gate 608S, while the reset terminals of flip-flops 601, 602, and 604 are connected to rail lead 8, 12 via OR gates 601R, 602R, and 604R. The set terminals of flip-flops 804 and 808 are connected to the rail lead 8, 12 via OR gates 804S and 808S, while the flip-flops 801 and 802 are connected to this rail lead via OR gates 801R and 802R. With the *x* and *y* registers so connected, an energizing signal from AND gate 901 to rail lead 8, 12 sets the flip-flops 608, 804, and 808 to their "1" state, the remaining flip-flops being set to the "0" state. This setting of the flip-flops results in the electron beam of the flying spot scanner being moved from a pre-existing position (i.e., point 12, 14) to the point 8, 12. The beam then remains at point 8, 12 until the next clock pulse.

The arrival of this next clock pulse results in the flip-flops 608 and 808 being set to their "1" state and all of the other flip-flops being set to their "0" state. The electron beam is then swept linearly from the point 8, 12 to the point 8, 8, thereby defining the scan line segment A. In similar fashion, the successive clock pulses delivered to counter 920 result in the flip-flops being set and reset in various combinations so as to cause the electron beam to define or trace the other scan line segments B through G.

It should be noted at this point that the flip-flops were shown, for the sake of clarity, connected to the last fourteen rail leads via a separate set of OR gates. It will be clear to those in the art, however, that the same OR gates described heretofore (611 through 618 and 811 through 818) can also be used for the interconnections between the last fourteen rail leads and the set and reset terminals of the flip-flops. Thus, while the OR gate 816 is shown as not being connected to any of the rail leads, it could in fact have been shown interconnected to the last fourteen rail leads in the same manner as OR gate 804R, and the latter thereby eliminated.

Figure 10:
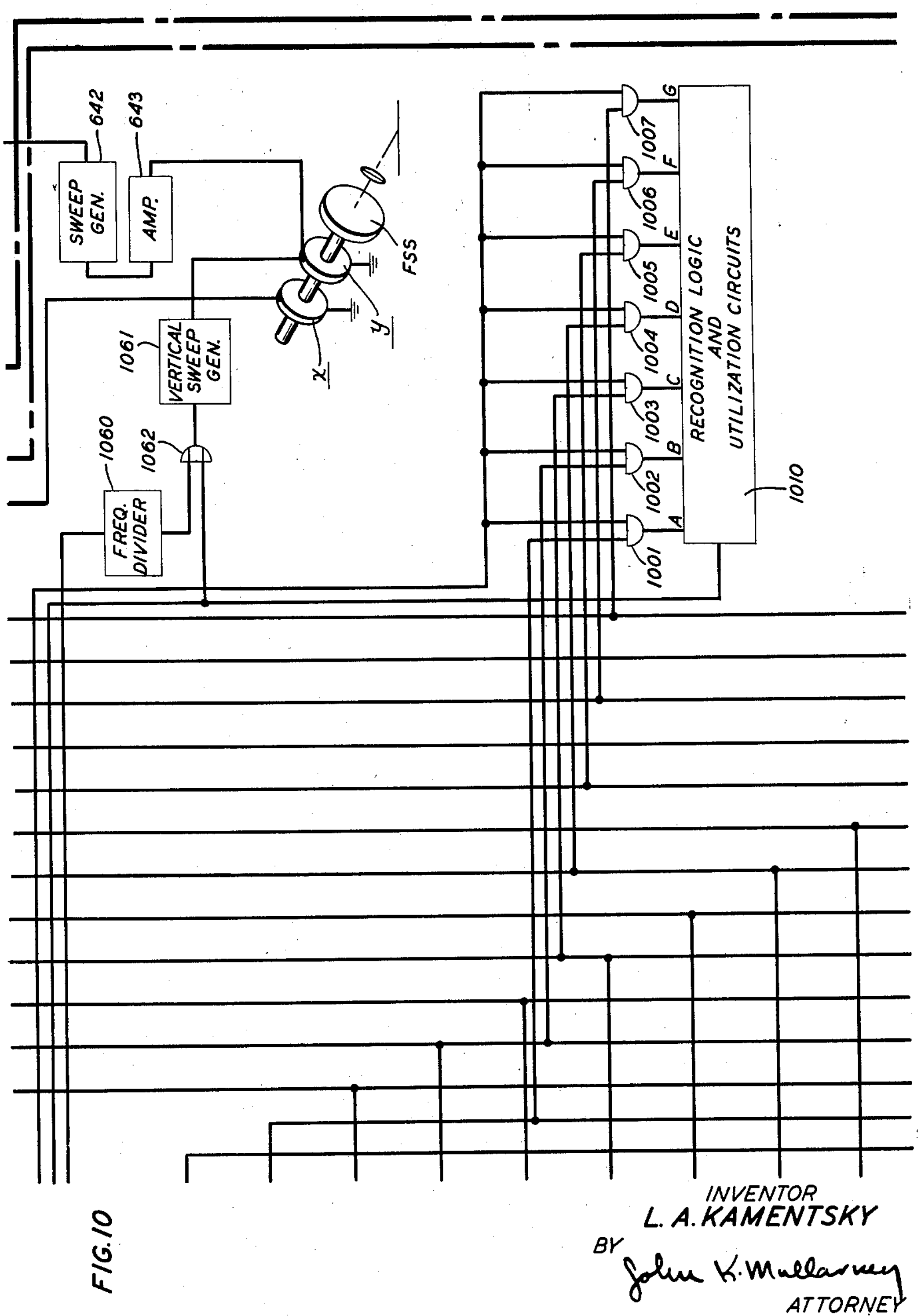
Figure 11:
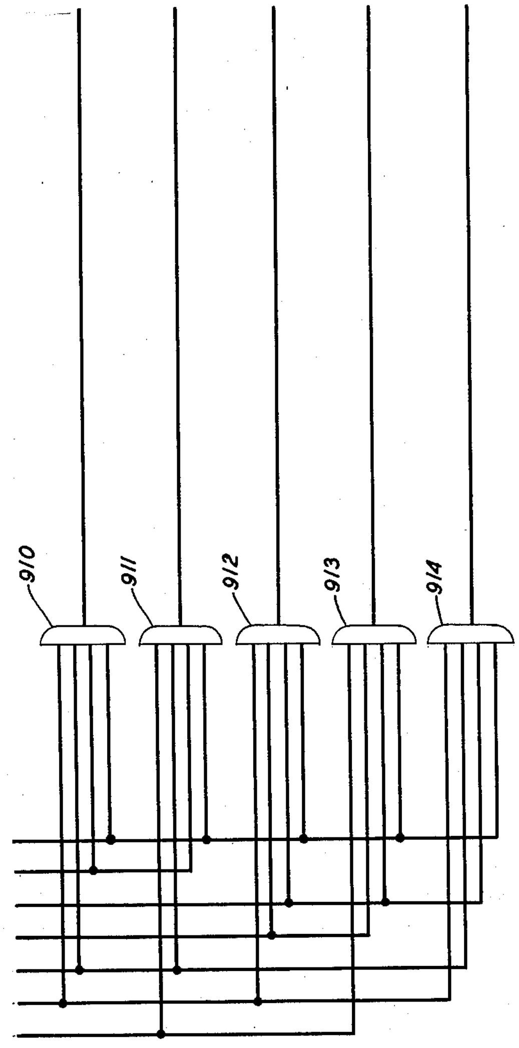

The output of threshold circuit 771 is delivered via lead 775 to each of the AND gates 1001 through 1007, shown in FIG. 10. The other input terminal of AND gate 1001 is connected to the second of the last fourteen rail leads which is designated 8, 8. The scan segment A is generated throughout the period that an energizing signal appears on the rail lead 8, 8. Accordingly, if the scan segment A encounters a line or mark, the threshold circuit will deliver a pulse sginal to AND gate 1001 resulting in the energization of the same. The AND gates 1002 through 1007 are respectively connected in succession to every other rail lead, as shown in FIG. 10. Hence, in similar fashion, the AND gates 1002 through 1007 will be energized if a mark is encountered during the scan segments B through G, respectively.

The output signals from AND gates 1001 through 1007 are fed to the character recognition logic and utilization circuits 1010. The setting or energizing of these AND gates is unique for each numeral. Accordingly, it is within the skill of one in the art to devise a logic circuit for recognizing or identifying each of the numerals. However, as mentioned heretofore, the recognition scan pattern 22 is essentially the same as the recognition scheme disclosed in the aforementioned copending application of T. L. Dimond. Accordingly, the logic circuitry disclosed in FIG. 15 of said copending application can be utilized herein for character recognition purposes.

The utilization circuit may be any type of circuit known in the art which in response to the machine language delivered thereto performs an operation such as punching a card or recording the information on a magnetic tape.

The four stage counter 920, of FIG. 9, counts to fifteen and then is reset to its initial "0" state upon the arrival of the next clock pulse. The AND gate 925 is connected to the (0) output leads of the four stages of counter 920 and therefore, when the counter is reset to its initial "0" state, an energizing signal appears on the output lead of gate 925. This latter energizing signal serves as a reset for the entire apparatus.

This reset signal from AND gate 925 is delivered via lead 980 to the recognition logic and utilization circuits 1010 to reset the same. The reset signal is further delivered via lead 980 and OR gate 1062 to the vertical sweep generator 1061 which in response thereto initiates a new sawtooth sweep voltage. The reset signal is also delivered to the OR gate 512 via capacitor 780. As mentioned heretofore, the output lead of OR gate 512 is connected to the reset terminal of binary counter 520 and to the reset terminals of flip-flops 735 through 739. The counter and flip-flops are therefore reset.

With the resetting of flip-flops 735 through 739, the energizing output signal from AND gate 740 is terminated. The inverter 741 then once again delivers an energizing potential to the AND gate 521. Further, an energizing signal is no longer fed to AND gate 900 and hence the delivery of further clock pulses to binary counter 920 is prevented. Thus, when the output signal from AND gate 740 is terminated, the clock pulses are switched from counter 920 back to counter 520 and the above-described operations are repeated.

As is known in the art, an increase in reliability can be achieved by the integration of redundant information. Accoridngly, it may be desirable to move the characters through the field of the scanner at a relatively slow rate. Each character will therefore be read a predetermined number of times. Integration, by means of counters and the like, can be built into the recognition logic so that a character indication is not provided until each character is read said predetermined number of times.

What has been described hereinbefore is a specific illustrative embodiment of the principles of the present invention. It is to be understood, however, that numerous other arrangements and variations may be utilized to advantage. For example, an alternative registration bar arrangement is illustrated in FIG. 16. This registration bar comprises simply a series of dashes 60. The corresponding registration scan pattern is shown superimposed on the registration bar and it comprises two horizontal scan line segments 61 and a vertical scan line segment 62 disposed therebetween. Thus, registration is achieved when the scan segments 61 each intersect a line on the paper and the scan segment 62 does not.

In the illustrative embodiment described in detail above, the registration bar was disposed above the row of handwritten characters. However, it will be clear that the registration bar could just as readily have been disposed below the row of characters. The second scan pattern would then be offset a corresponding distance above the first scan pattern.

It will be readily appreciated that the electron beam of flying spot scanner FSS may be electrostatically controlled rather than electromagnetically controlled, as described above. Furthermore, it is to be understood that the character recognition scan pattern may advantageously be of other and different configurations. In addition, the feed rate at which the carriage CR moves the characters to be recognized through the scanner may advantageously be adjusted to meet specific character recognition speeds or integration requirements.

While only the reading of Arabic numerals has been discussed, it will be clear to those in the art that the principles of the present invention may be readily extended to read alphabetical letters as well as Arabic numerals.

Accordingly, it is to be understood that the above described arrangement is illustrative of the application of the principles of the present invention and numerous modifications thereof may be devised by those skilled in the art without departing from the spirit and scope of the invention.

What is claimed is:

1. A character recognition system comprising scanning means for scanning a field which includes a horizontal registration bar having at least a first discontinuity therein and a character to be read vertically offset with respect to said discontinuity, means controlling said scanning means to successively generate a non-raster scan pattern having a configuration complementary to and registrable with said registration bar in the vicinity of said discontinuity, means for moving said scan pattern sequentially in each of a plurality of predetermined positions on said field, sensisng means operative to provide an output signal when said scan pattern is positioned to achieve the aforementioned registration, and means responsive to said output signal to control said scanning means to generate a character recognition scan pattern, said recognition scan pattern being positioned a predetermined distance from the last of the successively generated non-raster scan patterns.

2. In a character recognition system, scanning means for scanning a field which includes a printed registration bar having at least a first discontinuity therein and a character to be read vertically disposed with respect to said discontinuity, means controlling said scanning means to successively generate a first scan pattern having a configuration complementary to and registrable with said registration bar and the discontinuity therein, means for moving said first scan pattern sequentially in each of a plurality of predetermined positions on said field, and means operative in response to registration of said first scan pattern with said registration bar and discontinuity to control said scanning means to generate a second scan pattern, said second scan pattern being positioned a predetermined vertical distance from the last of the successively generated first scan patterns.

3. In a character recognition system, scanning means for scanning a field which includes a printed registration bar having at least a first discontinuity therein and a character to be read vertically offset with respect to said discontinuity, means controlling said scanning means to successively generate a first non-raster type scan pattern comprising a plurality of scan line segments, said scan pattern having a configuration complementary to said registration bar in the vicinity of said discontinuity, means for moving said first scan pattern sequentially in each of a plurality of predetermined positions on said field, and means operative in response to registration of said first scan pattern with said registration bar and discontinuity therein to control said scanning means to generate a second scan pattern comprising a plurality of scan line segments, said second scan pattern being centered a predetermined vertical distance from the last of the successively generated first scan patterns.

4. In combination, scanning means for scanning a field which includes a printed registration bar having at least a first discontinuity therein and a character to be read disposed directly below said discontinuity, means controlling said scanning means to successively generate a first non-raster type scan pattern comprising a plurality of scan line segments, said scan pattern having a configuration complementary to and registrable with said registration bar in the vicinity of said discontinuity, means for moving said first scan pattern successively in each of a plurality of predetermined vertically disposed positions on said field, and means operative in response to registration of said first scan pattern with said registration bar and discontinuity therein to control said scanning means to generate a second non-raster type scan pattern comprising a plurality of scan line segments, said second scan pattern being centered a predetermined distance below the last of the successively generated first scan patterns.

5. A character recognition system comprising scanning means for scanning a field which includes a printed horizontal registration bar having periodic interruptions therein and a row of characters extending substantially parallel to and offset from said registration bar, each of said characters being aligned with an interruption, means for controlling said scanning means to scan repeatedly in a first non-raster scan pattern including horizontal scan line segments, said scan pattern having a configuration complementary to and registrable with said registration bar at an interruption, means for moving said first scan pattern sequentially in each of a plurality of vertical positions of a column, means for generating a plurality of such vertical columns as the field of each character is moved through the field of said scanning means, and means operative in response to registration of said first scan pattern with said registration bar and an interruption therein to control said scanning means to generate a second non-raster scan pattern comprising a plurality of scan line segments, said second scan pattern being centered a predetermined vertical distance from the last of the successively generated first scan patterns.

6. A character recognition system as defined in claim 5 wherein said columns of vertical positions extend from one side of the horizontal registration bar to the other side.

7. A character recognition system comprising scanning means for scanning a field which includes a horizontal extended registration bar having periodic interruptions therein and a succession of characters to be read, said characters extending in a row substantially parallel to and offset from said registration bar with each character aligned with an interruption, means for moving said row of characters at a relatively slow rate through the field of said scanning means, means controlling said scanning means to successively generate a first non-raster scan pattern having a configuration complementary to and registrable with said registration bar in the vicinity of an interruption, means for moving said first scan pattern sequentially in each of a plurality of vertical positions of a column which extends on either side of said registration bar, means for generating a plurality of such vertical columns as each character is moved through the field of said scanning means, and means operative in response to registration of said first scan pattern with said registration bar and an interruption therein to control said scanning means to generate a second non-raster scan pattern comprising a plurality of scan line segments, said second scan pattern being centered a predetermined vertical distance from the last of the successively generated first scan patterns.

8. A character recognition system as defined in claim 7 wherein said registration bar comprises a series of dashes, and said first scan pattern comprises two aligned horizontal scan line segments and a vertical scan line segment disposed therebetween.

9. A character recognition system as defined in claim 7 wherein said registration bar comprises aligned alternate dashes and dots, each character being written a predetermined distance below a dot.

10. A character recognition system as defined in claim 9 wherein said first scan pattern comprises a pair of spaced aligned horizontal scan line segments and three spaced parallel vertical scan line segments disposed between said pair of horizontal scan line segments.

11. A character recognition system comprising scanning means for scanning a field which includes a horizontal extended registration bar having periodic interruptions therein and a succession of characters to be read, said characters extending in a row substantially parallel to and offset from said registration bar with each character aligned with an interruption, means for moving said characters at a relatively slow rate through the field of said scanning means, means controlling said scanning means to successively generate a first non-raster scan pattern having a configuration complementary to and registrable with said registration bar in the vicinity of an interruption, means for moving said first scan pattern sequentially in each of a plurality of vertical positions of a column which extends on either side of said registration bar, means for generating a plurality of such vertical columns as each character is moved through the field of said scanning means, sensing means operative to provide an output signal when said first scan pattern is positioned to achieve the aforementioned registration, means responsive to said output signal to control said scanning means to generate a second scan pattern comprising a plurality of scan line segments, said second pattern being positioned a given vertical distance from the last of the successively generated first scan patterns.

12. A character recognition system as defined in claim 11 wherein said given vertical distance is substantially equal to the distance that said row of characters is offset from said registration bar.

13. A character recognition system as defined in claim 11 wherein the row of characters to be recognized is moved in a direction perpendicular to said vertical columns.

References Cited in the file of this patent

UNITED STATES PATENTS

| | | |
|---|---|---|
| 2,741,312 | Johnson | Apr. 10, 1956 |
| 2,834,005 | Ketchledge | May 6, 1958 |
| 2,838,602 | Sprick | June 10, 1958 |
| 2,894,248 | Relis et al. | July 7, 1959 |